(12) United States Patent
Drummond

(10) Patent No.: US 7,469,657 B2
(45) Date of Patent: Dec. 30, 2008

(54) APPARATUS AND METHODS FOR CONTROLLING AN ANIMAL'S ACCESS TO FOOD

(76) Inventor: Alec Drummond, 39 Pearl St., Apt. 5R, Brooklyn, NY (US) 11201

( * ) Notice: Subject to any disclaimer, the term of this patent is extended or adjusted under 35 U.S.C. 154(b) by 297 days.

(21) Appl. No.: 11/075,567

(22) Filed: Mar. 8, 2005

(65) Prior Publication Data

US 2005/0145183 A1 Jul. 7, 2005

Related U.S. Application Data

(63) Continuation-in-part of application No. 10/786,764, filed on Feb. 25, 2004, now abandoned.

(60) Provisional application No. 60/449,821, filed on Feb. 25, 2003.

(51) Int. Cl.
*A01K 5/01* (2006.01)
(52) U.S. Cl. ............................................... 119/62
(58) Field of Classification Search .............. 119/51.12, 119/51.02, 61.5, 53, 62, 166, 52.4
See application file for complete search history.

(56) References Cited

U.S. PATENT DOCUMENTS

| | | | | |
|---|---|---|---|---|
| 1,324,667 A | * | 12/1919 | Hanson | 220/263 |
| 1,544,243 A | * | 6/1925 | Lehberger | 220/263 |
| 1,703,805 A | | 2/1929 | Witham | |
| 2,195,033 A | * | 3/1940 | Lehman | 220/263 |
| 2,349,283 A | * | 5/1944 | King et al. | 454/7 |
| 2,708,536 A | * | 5/1955 | Knoff | 222/510 |
| 2,791,984 A | * | 5/1957 | Robert | 119/51.12 |
| 3,121,419 A | * | 2/1964 | Gillespie | 119/62 |
| 3,176,656 A | * | 4/1965 | Bates | 119/62 |
| 3,599,608 A | * | 8/1971 | Esquival | 119/51.12 |
| 3,675,810 A | * | 7/1972 | Ross et al. | 220/495.08 |
| 4,147,133 A | * | 4/1979 | Molnar et al. | 119/55 |
| 4,175,516 A | * | 11/1979 | Savage | 119/62 |
| 4,389,976 A | * | 6/1983 | Novak | 119/62 |
| 4,617,874 A | * | 10/1986 | Zammarano | 119/51.12 |
| 4,671,210 A | * | 6/1987 | Robinson et al. | 119/51.12 |
| 4,793,290 A | * | 12/1988 | O'Donnell | 119/62 |
| 5,150,664 A | * | 9/1992 | Kirk | 119/51.12 |
| 5,349,925 A | * | 9/1994 | Zerato et al. | 119/62 |

(Continued)

OTHER PUBLICATIONS

Poon, Peter M., PCT/ISA/220 in respect of PCT/US05/06253, mailed Sep. 24, 2007.

(Continued)

*Primary Examiner*—Yvonne R. Abbott
(74) *Attorney, Agent, or Firm*—Bradley N. Ruben

(57) ABSTRACT

An apparatus and method for selectively controlling an animal or pet's access to food is provided by a platform that moves with relation to a base. A lever is connected between the chassis of the platform and the base, whereby parallel movement of the chassis towards the base causes an arm of the lever to engage a door adapted to prevent access to the food. An opposing force is provided and preferably adjustable by the user so the user can set the weight sufficient to cause movement between the platform and the base. The device can be constructed either to prevent access or to allow access to the food upon movement of the platform.

25 Claims, 6 Drawing Sheets

U.S. PATENT DOCUMENTS

| | | | |
|---|---|---|---|
| 5,613,464 A * | 3/1997 | Petzel | 119/55 |
| 5,649,499 A * | 7/1997 | Krietzman et al. | 119/52.1 |
| 5,709,169 A * | 1/1998 | Ryles | 119/62 |
| 5,975,024 A * | 11/1999 | Sheaffer | 119/477 |
| 6,349,671 B1 * | 2/2002 | Lewis et al. | 119/51.02 |
| 6,446,574 B2 * | 9/2002 | Bickley | 119/55 |
| 6,928,955 B1 | 8/2005 | Rokos | |
| 6,958,955 B2 * | 10/2005 | Yuzuki et al. | 368/82 |
| 7,073,461 B2 * | 7/2006 | Gonet | 119/61.5 |
| 7,100,534 B2 * | 9/2006 | van den Berg | 119/53 |
| 7,124,709 B1 * | 10/2006 | Greer | 119/61.5 |

OTHER PUBLICATIONS

Poon, Peter M., PCT/ISA/237 in respect of PCT/US05/06253, mailed Sep. 24, 2007.

* cited by examiner

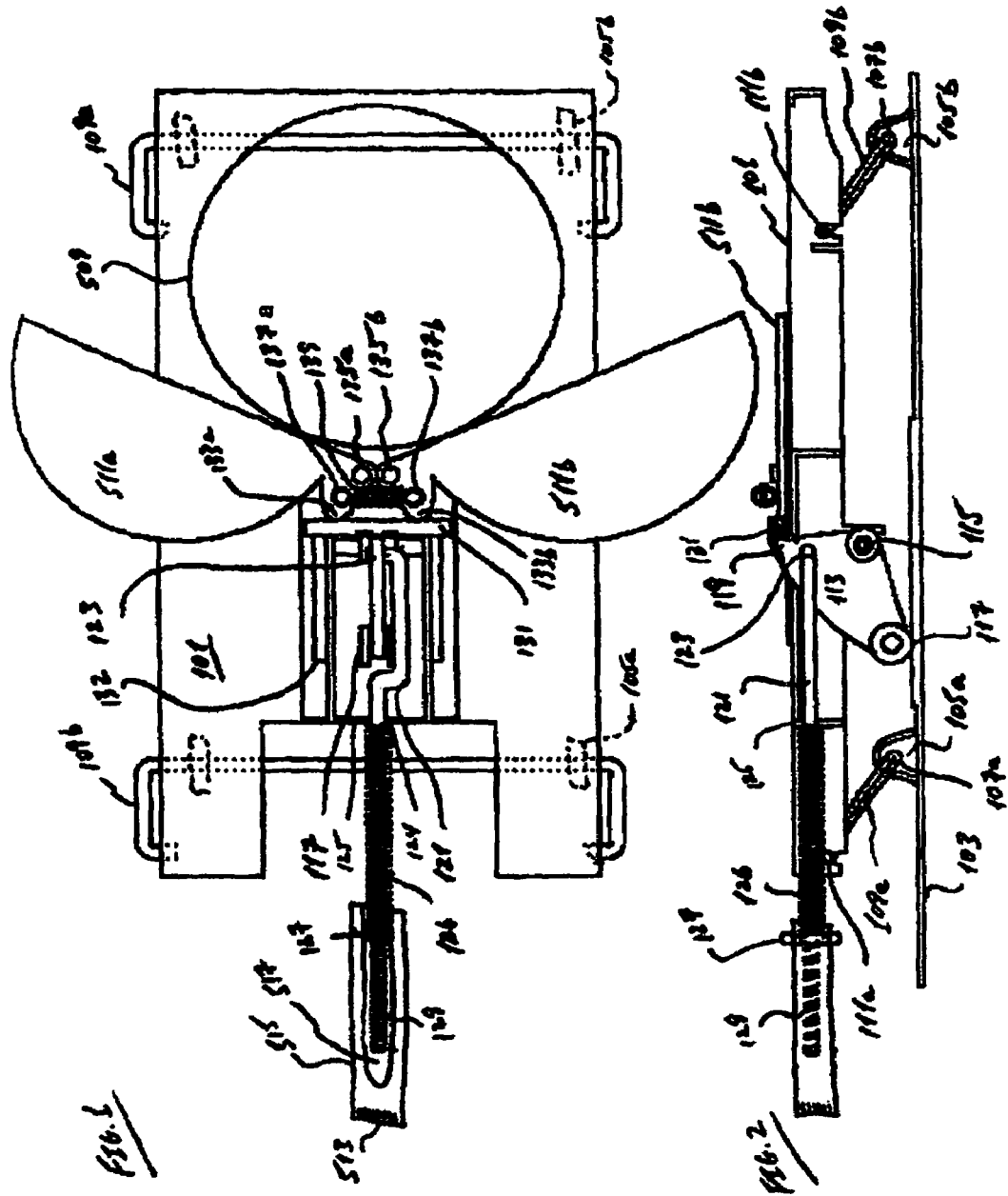

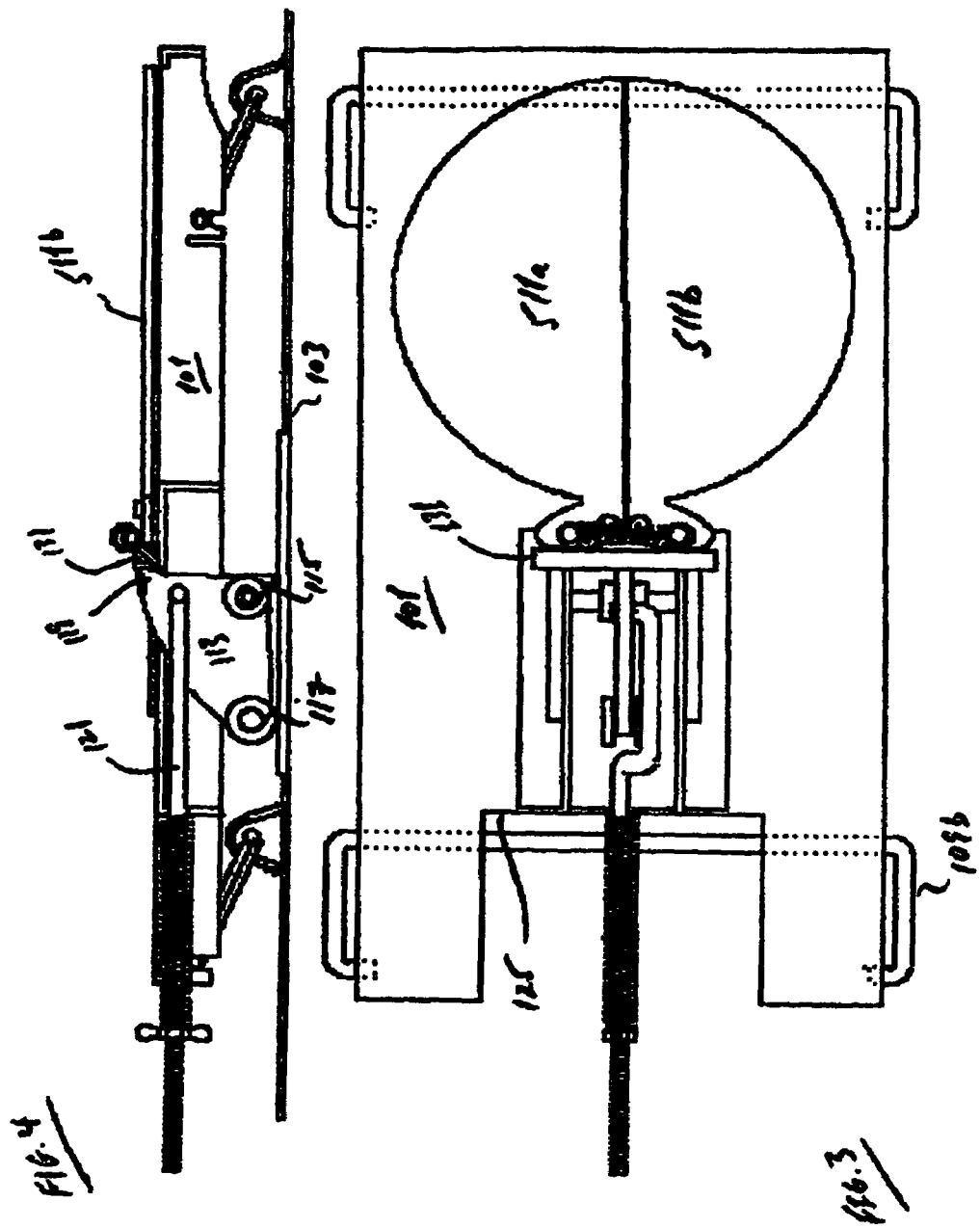

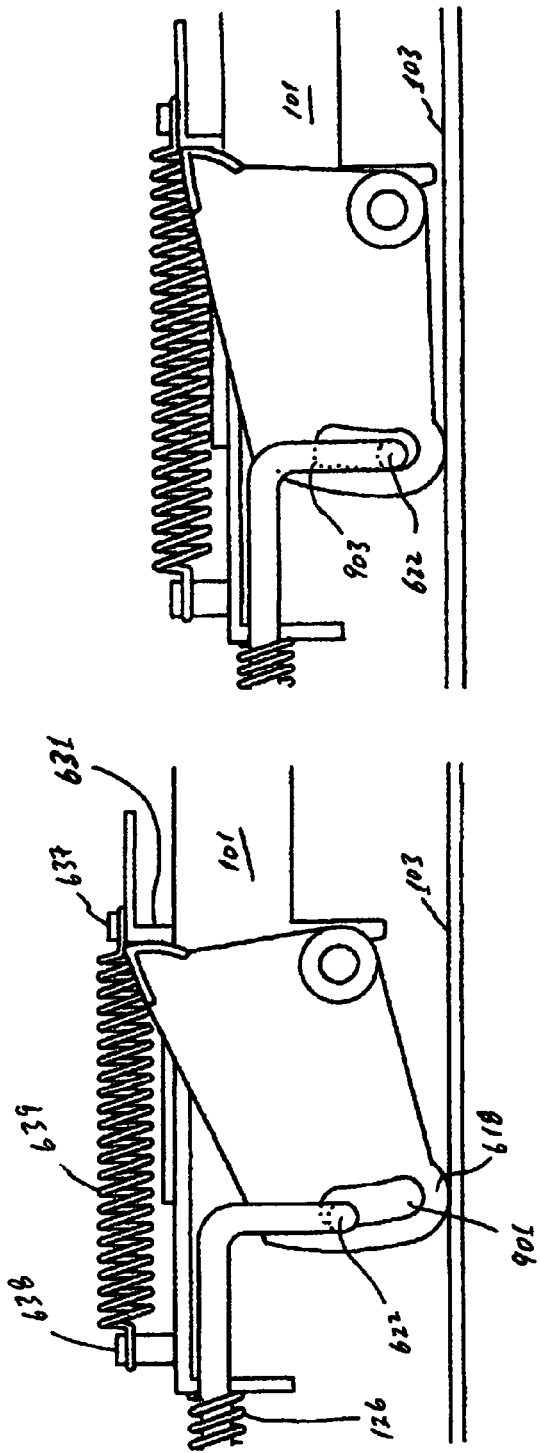
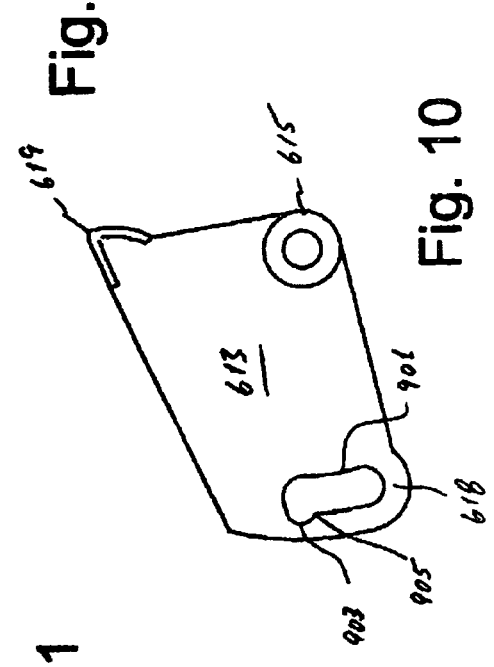
Fig. 12
Fig. 11
Fig. 10

APPARATUS AND METHODS FOR CONTROLLING AN ANIMAL'S ACCESS TO FOOD

RELATED APPLICATIONS

This application is a continuation-in-part of prior application Ser. No. 10/786,764, filed 25 Feb. 2004 now abandoned, which is based on provisional application 60/449,821, filed 25 Feb. 2003, the disclosures of which are both incorporated herein by reference in their entireties.

BACKGROUND OF THE INVENTION

1. Field of the Invention

This invention relates to various apparatus, and to methods employing such apparatus, for selectively allowing an animal access to its food, or preventing its access to another's food, the access contingent on the animal's relative weight.

2. The State of the Art

Various animal or pet feeding devices are known, some of which are described in the following U.S. Pat. Nos. 1,257,399; 1,703,805; 3,176,656; 3,935,837; 4,164,200; 4,829,935; 5,109,799; 5,349,925; 5,433,171; 5,613,464; 5,709,169; 6,044,795; 6,138,608; 6,349,671; and 6,622,656.

Of those devices, some are designed to make sure that sufficient food is present for the animal, and some have a timing mechanism that provides food and/or allows access to food based on a particular time or time of day (e.g., a door timed to open every 12 hours).

One of the foregoing patents (U.S. Pat. No. 5,709,169) provides a cover hinged to a platform by which the animal uncovers the food by stepping on the platform. However, in the case of an owner having two pets, it is often the case that the owner desires to segregate one animal's food from the other. Such may be the case where one of the animals is overweight, even though both animals should weight approximately the same amount. Or an owner might have two or more animals of very different sizes (weights), such as a large dog and a small dog (or a medium dog and a cat), and one (or both) requires a special diet that the owner wants to prevent the other animal from accessing. Or an owner might have a kitten or puppy and an older cat or dog and wants to leave food out for the kitten or puppy while preventing the older cat or dog from accessing the food.

None of the foregoing devices provides selective access to food based on a physical parameter of the animals, and especially not its weight.

SUMMARY OF THE INVENTION

One object of this invention is to provide a device that allows access to food only for one animal weighing less than a second animal, or being the lightest of multiple animals, or weighing less than a predetermined weight.

Another object of this invention is to provide a device that allows access to food only for one animal weighting more than a second animal, or being the heaviest of multiple animals, or weighing more than a predetermined weight.

Yet another object is to provide the foregoing devices without needing resort to any electronics, timers, or motorized parts.

Still a further object is to provide a more definitive opening and closing action of the access means.

In one embodiment, this invention provides a device for controlling access of an animal to food, which apparatus comprises a chassis movable with respect to a base, a port in the chassis through which food is accessed, and a door for opening and/or closing the port, the chassis and the base moving closer when an animal's weight is imparted to the chassis, a force adjustable by the user that opposes the animal's weight, and a mechanism for opening and/or closing the doors based on movement between the chassis and the base.

In another embodiment, this invention provides a method for controlling access of an animal to an opening in which food is stored, comprising providing a platform on which the animal places its feet and having an opening through which the animal can access food, providing at least one movable door for preventing access to the food, providing a base to which the platform is connected and allowing vertical movement of the platform towards and away from the base, providing a lever that engages and moves the door as a function of the distance between the platform and the base, providing tension on the lever to inhibit engagement of the lever with the door, and allowing an animal to stand on the platform, thereby causing the platform to move vertically towards the base if the weight of the animal is sufficient to overcome the tension, such movement rotating the lever and engaging the lever with the door to move the door to either prevent access or to provide access, as the case may be for the configuration of the device. By "stand" it should be understood that a four-legged animal may stand on the platform with only two feet, or may stand with four feet.

BRIEF DESCRIPTION OF THE DRAWINGS

FIG. 1 depicts an idealized plan view of one embodiment of the invention with access to the animal's food.

FIG. 2 depicts an idealized side view of the embodiment in FIG. 1.

FIG. 3 depicts an idealized plan view of one embodiment of the invention with access to the animal's food denied.

FIG. 4 depicts an idealized side view of the embodiment in FIG. 3.

FIG. 10 is a view of a lever cam with catch according to this invention.

FIG. 11 is a close up partial side view of the lever area as shown in FIG. 9.

FIG. 12 is a close up partial side view of the lever area as shown in FIG. 7.

DETAILED DESCRIPTION OF SPECIFIC EMBODIMENTS

The invention will be described with reference to a device where access to the food is normally permitted to a first animal of a given weight and is denied to a second animal having a greater weight or a lesser weight.

Figure 5:
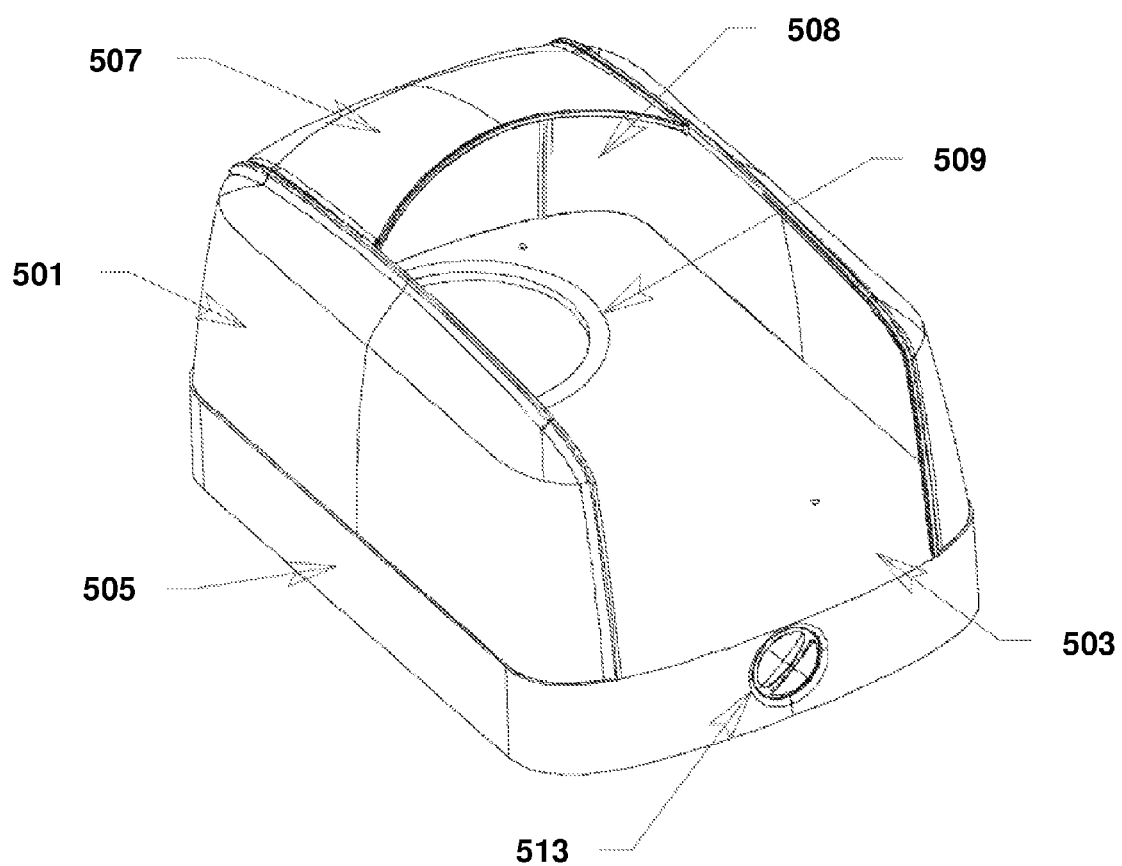
FIG. 5 is an idealized perspective view of the aesthetic appearance of the device.

With reference to FIG. 5, from the user's, and animal's, point of view, what is seen is the device 501 including a platform 503 supported within a skirt 505 and enclosed partially by a screen or shield 507 having an opening 508 permitting access to an area 509 in which food is normally found.

Shown in this figure, access to the food bowl is prevented by doors 511a and 511b. A tension knob 513 is presented for easy adjustment by the user, and its function will be described later.

The platform is disposed over and in contact with a chassis 101 as shown in FIG. 5, or is integral with the chassis as shown in FIGS. 1 and 2; as used herein, a chassing having a standing surface includes both of these embodiments (that is, a separate platform attached to the chassis, or a unitary chassis-platform construction). The chassis is supported on a base 103 having four supports, two 105a/b of which are labeled in FIG. 2, each having a bore 107a/b for connection to a parallel arm 109a/b that engages the chassis at a pivot 111a/b. Such a connection is essentially a parallel rule in a plane form, as is seen in FIG. 1, so that the chassis moves vertically with respect to the base by the pivoting of the parallel arms. The parallel arms are preferably both in a "C" shape and made of metal (steel), the shape being useful for preventing twisting or rotation of the chassis with respect to the base, and metal being generally more durable than plastic. As shown, the pair of parallel arms and the chassis and the base form a parallelepiped, as seen in side view in FIGS. 2 and 4. If the weight were not well-distributed through this configuration; for example, if there were four separate pivot arms instead of two such pivot arms being merged into a single C-shaped arm, the pivots could jam.

As mentioned, the embodiment shown is described with reference to denying access to food to a heavier animal. Preferably, the device is thus designed as shown in these figures, with the doors 511a/b in a normally opened position. A food bowl with food is placed within the opening 509 and resides on the base (or may be supported along the periphery of the opening 509, such as by being supported on the chassis).

To close the doors when the heavier animal steps onto the platform, a combination of a type of bell-crank lever, a slider, and a tension rod are used. The lever 113 is attached to the chassis at a pivot 115 at its center, with one arm interacting with the base at wheel 117. The wheel can be substituted with a pivot attached to the base, or with the arm of the pivot sliding on the base. The other end 119 of the lever acts as an abutting device. From the viewpoint shown in the figure, the lever rotates clockwise about pivot 115. Proximate the abutment end of the lever a rod 121 is connected to the lever at a pivot 123. The rod extends through an opening 124 in a wall 125 formed within the chassis and continues on. A helical (coil) spring 126 is disposed under compression around the rod and along the length of the rod and is secured between the wall 125 and a wing nut 127 engaged with a threaded portion 129 of the rod, the rod and spring combination being a tension rod. Accordingly, the tension on the spring from the wing nut effects the force needed to rotate the lever and move the tension rod. The adjustment knob 513 shown in FIG. 5 is the end portion of a cylinder 515 having a channel 517 in which the wings of the wing nut reside, so that turning the adjustment knob turns the wing nut, thereby altering the tension on the rod; if a nut with a single wing is used there need be only one channel, and with a nut having two wings (as is commercially available) opposing channels are desired. A nut with no wings may also be used where the cylinder has a bore of a geometry suitable for using the cylinder effectively as a socket wrench (e.g., a conventional hexagonal nut with a cylinder having a hexagonal bore.) Although not as desirable, an elastic, compressible material can be substituted for all or part of the spring, or a different type of spring (such as a leaf spring) can be used. Each of these can be considered as a spring.

The abutment end of the lever pushes against a slider bar 131, which is part of a slider 132 that moves within and along the edge of an opening in the chassis. The slider arm interacts with abutment cams 133a/b at the ends of the doors 511a/b. The doors rotate on their own pivots 135a/b, and are maintained in an open position by means of a spring 139 disposed between posts 137a/b or otherwise attached to and spanning the doors. The slider can be integral, or hingeably connected, with the other end 119 of the lever, so that engagement of the lever end 119 with the cams includes engagement through a device such as the slider bar 131.

In operation, the adjustment knob is set so that an animal over a predetermined weight will have sufficient weight to close (or open) the doors. In the presently shown embodiment, a lighter animal will be able to put weight on the platform (whether standing on the platform or putting only the front feet on the platform) and eat from the bowl without the doors closing. (Alternatively, the device can be configured so that it requires the animal's weight to be greater than the predetermined weight to open the doors.) Thus, when an animal that is above the predetermined weight (or with just the front feet is greater than the predetermined weight) steps onto the platform, the animal's weight is supported effectively by, and activates movement of, the chassis. The chassis will tend to move down and back (to the left in the drawings) because of the parallelepiped configuration. As the chassis moves towards the base, the wheel attached to the lever will engage the base and cause the lever to rotate around the pivot 115 (clockwise as depicted in FIG. 2) so that the abutment arm of the lever moves against the slider bar, to the right as depicted in the figure. The force opposing this rotation is the tension from the spring transmitted through the rod to the abutment end of the lever, moving it to the left as depicted in the figure. Thus, the adjustment knob sets the tension in the spring corresponding to an animal of a predetermined weight. An animal weighing more than the predetermined weight will overcome the spring force, causing the chassis to move down toward the base and the abutment arm of the lever to move against the slider bar. The slider bar then presses against the abutment feet (cams 133a/b), forcing the doors to pivot closed because of the position of the abutment feet (cams 133a/b) with respect to the door pivots. Generally, the force of the spring on the tension rod is significantly greater than the force of the spring keeping the doors open so that the door spring does not significantly affect the force (or weight) needed to close the doors.

As seen in FIGS. 3 and 4, when an animal above the weight threshold steps onto the platform, the platform and chassis move toward the base and the abutment end of the lever moves against the slider arm, forcing the doors closed. Although the drawings are not drawn to scale, it can be seen that the wall 125 moves backwards by reference to its distance from the pivot bar 109b, seen vertically comparing FIGS. 2 and 4.

When the animal steps off the standing surface (whether a separate platform or one integral with the chassis), the spring tensions repositions the door to their initial position (open or closed). Of course, an elastic material (such as an elastic band) can be substituted for the spring.

Figure 7:
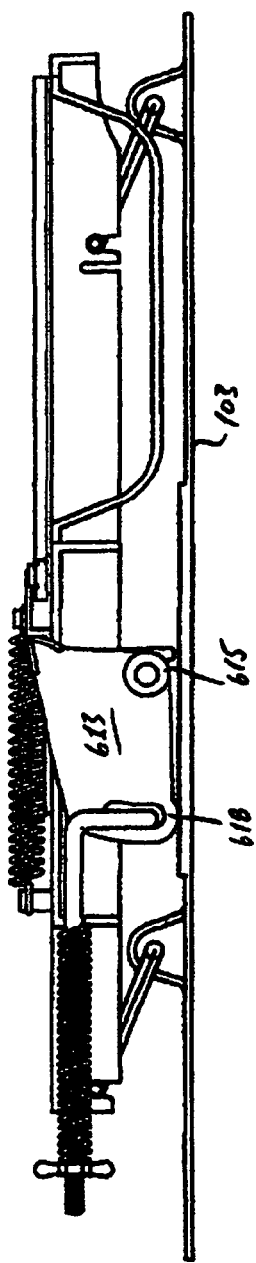
FIG. 7 depicts an idealized side view of the embodiment in FIG. 6.
Figure 6:
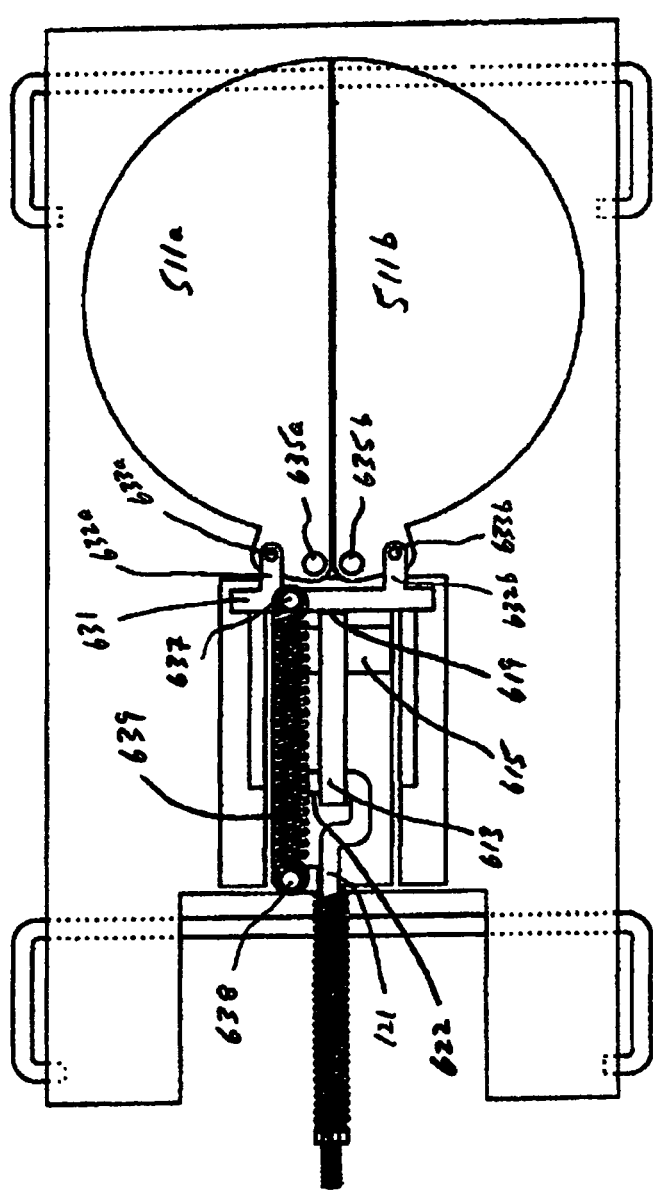
FIG. 6 depicts an idealized plan view of another embodiment of the device with access to the animal's food denied.

In another embodiment, the lever and its connection to the doors, chassis, and rod is altered to provide a more assertive closing and opening of the doors 511a/b. As shown in FIG. 6, a plan view, and FIG. 7, a side view, the rod 121 has a rod end 622 or rod arm that projects through the lever 613, similar to the embodiment shown in FIGS. 1-4. FIGS. 6 and 7 show the device when the animal's weight greater than desired, as determine with spring 129 and nut 127, is applied to close the doors. The lever end 619 is abutted against the bar 631.

Figure 8:
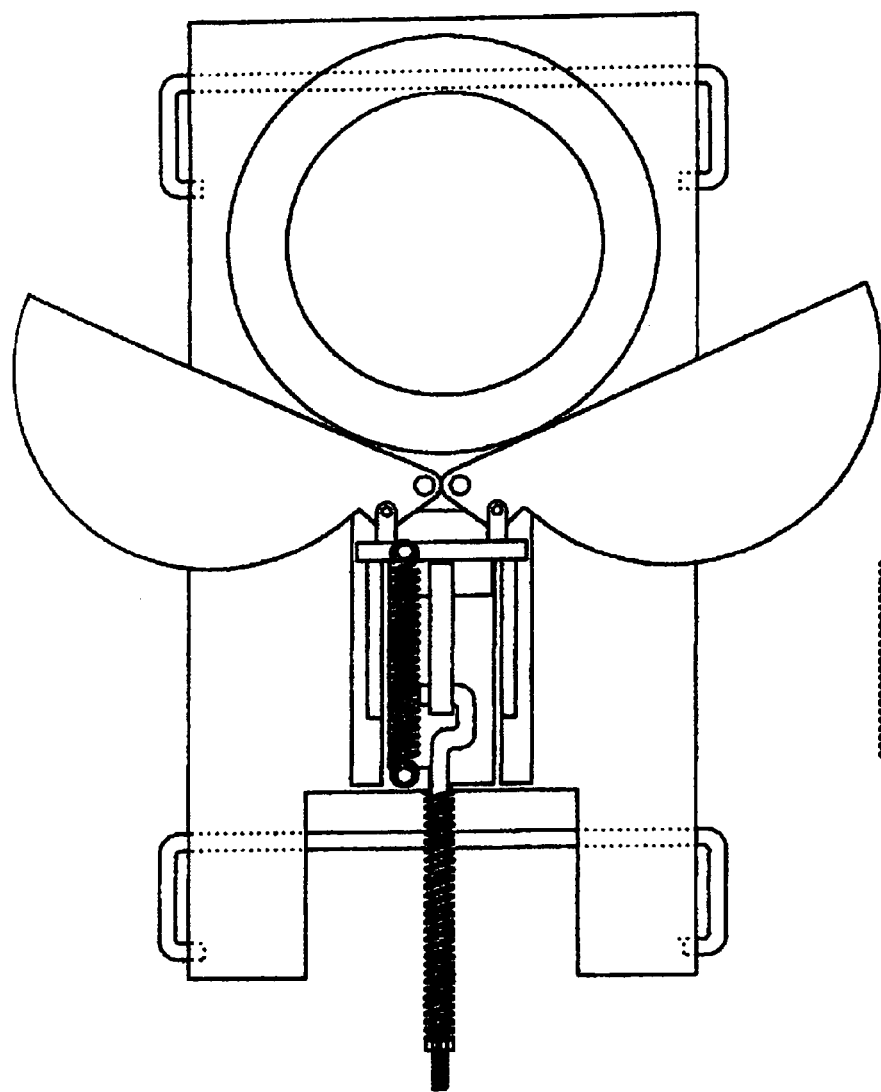
FIG. 8 depicts an idealized plan view of another embodiment of the device with access to the animal's food.
Figure 9:
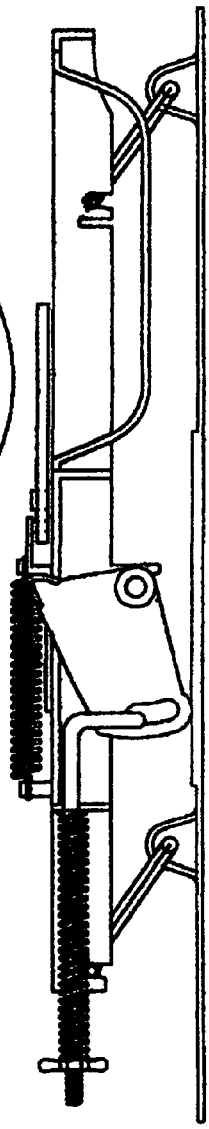
FIG. 9 depicts an idealized side view of the embodiment in FIG. 8.

Through respective bar extensions 632*a/b* that connect with respective cams 633*a/b*, the lever end communicates the force of the platform to cause the doors to move about pivots 535*a/b* and close as shown in these figures. A post 637 on the bar 631, and another post 638 on the frame, provide supports for a spring 639; this spring is akin to spring 139 in FIGS. 1-4 by providing a force to the cams tending to open the doors. An elastic material can be substituted for the spring 639. As shown in FIGS. 8 and 9, when a too heavy animal's weight is removed from the platform, the lever end 619 rotates away from the doors, allowing the spring 639 to open the doors.

The lever 613 is shown in more detail in FIGS. 10-12. In particular, as described above, instead of a wheel the lever has a foot 618 that slides on the base. In the embodiments shown in FIGS. 1-4, the rod 121 engages the lever 113 at a single pivot point 123. In the embodiments shown in FIGS. 10-12, the lever 613 has a lever channel 901, preferably slightly arcuate, running essentially orthogonal to the base. The lever channel has a notch 903 in which the rod end 622 normally resides. The notch forms a concavity outside of the channel geometry at the shoulder 905. In effect, engagement of the rod arm with the arcuate channel and notch provides a cam with a pawl. As shown in FIG. 11, the foot 618 of the lever rests on the base 103 and the rod end 622 resides in the notch 903 near the end of the lever channel 901. Spring 126 provides a force away from the doors (to the left in FIGS. 11 and 12) which acts to retain the rod end in the notch. When a too heavy animal steps onto the platform, the downward force causes the lever to rotate about the pivot 615, forcing the lever end 619 against the bar 631 and closing the doors. At the same time, the rod end is moved out of the notch, over the shoulder, and into the channel. The notch provides a benefit of making the opening and closing of the doors more discrete. If an animal's weight is sufficient to close the doors, the rod end will move over the shoulder into the channel and closing the doors. The channel is preferably slightly curved, concave with respect to pivot 615, and while the rod end resides in the channel, the doors will remain closed. When the weight is released, the rod end will retreat up the channel, over the shoulder, and reside in the notch; the doors will stay open as long as the rod end remains in the notch.

Based on the foregoing, it should be apparent that various modifications and changes can be made without departing from the scope and spirit of the invention as defined by the appended claims. For example, instead of the pivot bars, the base and chassis can cooperate via slides (e.g., a rod disposed in a sleeve). It is preferred that the chassis be supported at the corners of the platform so that the weight is relatively evenly distributed to facilitate operation of the mechanisms. Further, as mentioned, the parallel arms are shown as two separate C-shaped devices, although each pivot arm could be separated into two (connecting only the adjacent pivots 105 and 111). Instead of a heavier animal causing the doors to close, the heavier animal can cause the doors to open if the cams for the doors are reversed so that the door and pivot combination is arranged more like a pair of scissors. The shield shown in FIG. 5 is beneficial for reducing the size of the device, since the food is stored near one end of the platform edge, to prevent another animal from just leaning over the shield necessitates that animals attempting to access the food do so only through the opening. The presence of the shield (or cowl) also allows the footprint of the device to be smaller by providing an enclosure or nook having a particular opening area and with the food disposed the farthest distance away from that opening area. Because the shield allows for a smaller platform, the animal need only place its front feet/paws on the platform. The shield is preferably transparent or translucent. The food should be sufficiently distant from the opening in the shielding that the animal must place its front feet/paws on to the platform in order to access the food. The device also can be made larger, so that the animal must have all four feet on the platform to be able to reach the food. The lever 113 can be made as a cam, or the mechanism can use a spring tensioned between the chassis and the base, and movement between the chassis and base transmitted by a belt to chain to a gear or cam mechanism for opening or closing the door(s). The tension rod can be replaced in whole or in part by a counter-weight.

The device is preferably made from molded plastic. The wheel and the abutment end of the lever can be made of a different type of plastic than the chassis, base, etc. to provide the desired friction: the abutment needs to slide, so a plastic such as DELRIN brand acetal resin or a nylon, and the wheel should frictionally engage the base or may also slide. The pivot arms 109*a/b* and the springs, tension rod, and wing nut are preferably metal.

Thus, the invention includes a chassis movable with respect to a base and having an opening through which food is accessed and a door for opening and/or closing the opening, the chassis and the base moving closer when an animal's weight is imparted to the chassis, a force adjustable by the user that opposes the animal's weight, and a mechanism for opening and/or closing the doors based on movement between the chassis and the base.

Given the foregoing disclosure, it is seen that the present invention has related applications instead of just the feeding of pets or livestock. For example, a platform can be suspended in a tree or on a pedestal with bird food, and the device adjusted to prevent, for example, a squirrel or racoon from accessing the bird food.

Returning to pet owners, an owner having two pets may desire two of these devices, one designed to prevent the heavier animal from accessing food (closing the doors if the heavier animal steps on the device) and the other designed to allow only the heavier animal access to the food (opening the doors if the heavier animal steps on the device).

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. An apparatus for controlling access of an animal to an opening in which its food is stored, comprising:
   A. a standing surface on which the animal places at least part of its weight;
   B. a chassis connected to or integral with the standing surface and supported essentially parallel to both said standing surface and a base, the chassis having an opening in which food can be placed;
   C. a movable connection between the base and the chassis allowing the chassis to move towards and away from the base while maintaining said essentially parallel orientation;
   D. at least one door attached to the chassis by a door pivot and adapted to cover the opening in which the food is placed and pivoting in a plane essentially parallel with said essentially parallel orientation;
   E. a lever, pivotally connected to the chassis by a first pivot, having a first arm that engages the base and a second arm that engages the door to move the door about the door pivot; and
   F. a tension rod including a spring tending the pivot arm away from engagement with the door.

2. The apparatus of claim 1, further comprising a skirt depending from the standing surface and a shield rising from the standing surface to provide an opening for access to the platform.

3. The apparatus of claim 1, further comprising means for changing the tension on the tension rod.

4. The apparatus of claim 1, wherein the movable connection includes a pair of parallely disposed bars.

5. The apparatus of claim 1, wherein the tension on the tension rod is adjustable.

6. The apparatus of claim 1, wherein the lever has a channel disposed essentially orthogonal to the base, the channel having a notch at a portion of the channel away from the base, the notch defining a shoulder in the channel, and an end of the tension rod disposed within the channel or the notch.

7. A method for controlling access of an animal to an opening in which its food is stored, comprising:
   A. providing a platform on which the animal places its feet and having an opening through which the animal can access its food;
   B. providing at least one movable door for preventing access to the food, the door adapted to move essentially parallel to the platform;
   C. providing a base parallel with the platform and to which the platform is connected, and allowing movement of the entire platform towards and away from the base while maintaining the parallel orientation;
   D. providing a lever that engages and moves the door as a function of the distance between the platform and the base;
   E. providing tension on the lever to inhibit engagement of the lever with the door; and
   F. allowing an animal to stand on the platform, thereby causing the entire platform to move vertically towards the base if the weight of the animal is sufficient to overcome the tension, such vertical movement effective to cause the lever to open the door to provide access through the opening or to close the door to prevent access through the opening.

8. The method of claim 7, wherein the door closes upon movement of the platform towards the base.

9. The method of claim 7, wherein the door opens upon movement of the platform towards the base.

10. The method of claim 7, further comprising providing a shield upstanding from the platform to provide a particular opening area for access to the platform.

11. The method of claim 7, wherein the movement of the platform towards and away from the base includes a pair of parallely disposed bars.

12. The method of claim 7, further comprising the step of adjusting the tension on the lever.

13. The method of claim 7, wherein the lever has a channel disposed essentially orthogonal to the base, the channel having a notch at a portion of the channel away from the base, the notch defining a shoulder in the channel, and an end of the tension rod disposed within the channel or the notch.

14. Apparatus for controlling an animal's access to food, comprising:
   A. a base;
   B. a chassis having a standing surface and disposed essentially parallel to and movable with respect to the base, the chassis having a port through which food is accessed;
   C. a movable door for opening and/or closing the port, the door adapted to move essentially parallel to the standing surface;
   D. movement means for allowing the chassis and the base to move together and apart, said movement means maintaining the essentially parallel orientation of the chassis and base;
   E. force means comprising a user-adjustable force for opposing the animal's weight; and
   F. door means for opening or closing the door based on movement between the chassis and the base.

15. The apparatus of claim 14, wherein the movement means includes parallel arms.

16. The apparatus of claim 14, wherein the force means comprises a spring.

17. The apparatus of claim 14, wherein the door means includes a lever pivotally attached to the chassis, the lever having a first arm that interacts with the base and a second arm that interacts with the door.

18. The apparatus of claim 14, wherein the standing surface further comprises a shield upstanding therefrom to provide a particular opening area for access to the platform.

19. The apparatus of claim 14, wherein the movement means includes a pair of parallely disposed bars.

20. The apparatus of claim 14, wherein the door means comprises a lever having a channel disposed essentially orthogonal to the base, the channel having a notch at a portion of the channel away from the base, the notch defining a shoulder in the channel, and an end of the tension rod disposed within the channel or the notch.

21. A method for providing selective access, comprising:
   A. providing (i) a chassis having (a) a platform for accepting a pressure force due to an animal's weight, (b) an access hole, and (c) a movable barrier for covering and uncovering the access hole, the barrier adapted to move essentially parallel with the platform, and (ii) a base;
   B. controlling movement of the entire chassis towards and away from the base so as to maintain a desired essentially parallel orientation between the platform and the base;
   C. applying a counterforce acting between the chassis and the base to resist said pressure force; and
   D. mechanically transmitting the difference between the pressure force and the counterforce to remove or to cover or uncover said access hole with said movable barrier, respectively, when the pressure force exceeds the counterforce, and, respectively, uncovering or covering said access hole with said movable barrier when the counterforce exceeds the pressure force.

22. The apparatus of claim 1, further comprising a shield upstanding from the platform to provide a particular opening area for access to the platform.

23. The method of claim 21, further comprising providing a shield upstanding from the platform to provide a particular opening area for access to the platform.

24. The method of claim 21, wherein the step of controlling the movement includes the step of movably connecting the chassis and the base with a pair of parallely disposed bars.

25. The method of claim 21, wherein the counterforce is an adjustable force.

* * * * *